(12) United States Patent
Stammer et al.

(10) Patent No.: US 8,487,037 B2
(45) Date of Patent: Jul. 16, 2013

(54) PREPARATION OF ORGANOSILOXANE POLYMERS

(75) Inventors: Andreas Stammer, Pont-a-Celles (BE); Andreas Wolf, Huenstetten (DE)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 13/260,108

(22) PCT Filed: Mar. 18, 2010

(86) PCT No.: PCT/EP2010/053567
§ 371 (c)(1),
(2), (4) Date: Nov. 23, 2011

(87) PCT Pub. No.: WO2010/108853
PCT Pub. Date: Sep. 30, 2010

(65) Prior Publication Data
US 2012/0059114 A1  Mar. 8, 2012

(30) Foreign Application Priority Data
Mar. 26, 2009  (GB) ................... 0905204.4

(51) Int. Cl.
*C09D 183/04* (2006.01)
*C08G 77/08* (2006.01)

(52) U.S. Cl.
USPC ........................................ 524/588; 528/23

(58) Field of Classification Search
None
See application file for complete search history.

(56) References Cited

U.S. PATENT DOCUMENTS

| | | | |
|---|---|---|---|
| 2,759,007 A | 8/1956 | Dunham, Jr. et al. | |
| 2,759,008 A | 8/1956 | Dunham, Jr. et al. | |
| 3,220,879 A | 11/1965 | Stare et al. | |
| 3,308,203 A | 3/1967 | Metevia et al. | |
| 3,341,486 A | 9/1967 | Murphy | |
| 3,378,520 A | 4/1968 | Noll et al. | |
| 3,419,593 A | 12/1968 | Willing | |
| 3,427,270 A | 2/1969 | Northrup | |
| 3,433,765 A | 3/1969 | Geipel | |
| 3,480,583 A | 11/1969 | Bailey et al. | |
| 3,715,334 A | 2/1973 | Karstedt | |
| 3,814,730 A | 6/1974 | Karstedt | |
| 3,817,894 A | 6/1974 | Butler et al. | |
| 3,839,388 A | 10/1974 | Nitzsche et al. | |
| 3,923,705 A | 12/1975 | Smith | |
| 3,957,842 A | 5/1976 | Prokai et al. | |
| 3,962,160 A | 6/1976 | Beers et al. | |
| 3,971,751 A | 7/1976 | Isayama et al. | |
| 4,020,044 A | 4/1977 | Crossan et al. | |
| 4,022,941 A | 5/1977 | Prokai et al. | |
| 4,071,498 A | 1/1978 | Frye et al. | |
| 4,147,855 A | 4/1979 | Schiller et al. | |
| 4,240,450 A | 12/1980 | Grollier et al. | |
| 4,247,445 A | 1/1981 | Smith, Jr. et al. | |
| 4,250,290 A | 2/1981 | Petersen | |
| 4,312,801 A | 1/1982 | Hiriart Brodin et al. | |
| 4,348,533 A * | 9/1982 | Alanko et al. | 556/457 |
| 4,357,438 A | 11/1982 | Sattlegger et al. | |
| 4,358,558 A | 11/1982 | Shimizu | |
| 4,433,096 A | 2/1984 | Bokerman et al. | |
| 4,472,563 A | 9/1984 | Chandra et al. | |
| 4,486,567 A | 12/1984 | Bowman et al. | |
| 4,515,834 A | 5/1985 | Fukayama et al. | |
| 4,564,693 A | 1/1986 | Reiderer | |
| 4,567,231 A * | 1/1986 | Huebner et al. | 524/837 |
| 4,568,701 A | 2/1986 | Hopkins, Jr. | |
| 4,568,707 A | 2/1986 | Voigt et al. | |
| 4,599,438 A | 7/1986 | White et al. | |
| 4,607,115 A * | 8/1986 | Riederer et al. | 556/462 |
| 4,614,760 A | 9/1986 | Horman et al. | |
| 4,624,676 A | 11/1986 | White et al. | |
| 4,655,767 A | 4/1987 | Woodard et al. | |
| 4,701,490 A | 10/1987 | Burkhardt et al. | |
| 4,824,891 A | 4/1989 | Laurent et al. | |
| 4,902,499 A | 2/1990 | Bolich, Jr. et al. | |
| 4,902,575 A | 2/1990 | Yukimoto et al. | |
| 4,906,707 A | 3/1990 | Yukimoto et al. | |
| 4,918,121 A | 4/1990 | Peccoux et al. | |
| 4,926,673 A | 5/1990 | Laurent et al. | |
| 4,965,311 A | 10/1990 | Hirose et al. | |

(Continued)

FOREIGN PATENT DOCUMENTS

| | | |
|---|---|---|
| CN | 1346384 A | 4/2002 |
| DE | 2364856 | 12/1973 |

(Continued)

OTHER PUBLICATIONS

English language abstract for CN 1346384 extracted from espacenet.com database, dated Jul. 16, 2010, 22 pages.
English language abstract for DE 3217516 extracted from espacenet.com database dated Jul. 15, 2008.
English language abstract for DE 3342026 extracted from espacenet.com database dated Jul. 15, 2008.
English language abstract for DE 3342027 extracted from espacenet.com database dated Jul. 15, 2008.

(Continued)

*Primary Examiner* — Robert S Loewe
(74) *Attorney, Agent, or Firm* — Howard & Howard Attorneys PLLC

(57) ABSTRACT

A method of making a polysiloxane containing polymer is described. The method comprises the steps of: i) Preparing a polysiloxane containing polymer by the polycondensation of siloxane containing monomers and/or oligomers which comprise at least 2 condensable groups per molecule, in the presence of (a) one or more condensation catalysts and optionally one or both of (b) a diluent (a plasticizer and/or extender) and/or an end-blocking agent; and ii) Where required quenching the polymerization process. The diluent, when present, is substantially retained within the resulting diluted polysiloxane containing polymer and the process takes place at a pressure of at least $75 \times 10^5$ Pa (0.75 MPa).

12 Claims, No Drawings

U.S. PATENT DOCUMENTS

| | | | |
|---|---|---|---|
| 4,968,766 | A | 11/1990 | Kendziorski |
| 4,985,476 | A | 1/1991 | Endres et al. |
| 4,990,555 | A | 2/1991 | Trego |
| 5,000,029 | A | 3/1991 | Laurent et al. |
| 5,043,012 | A | 8/1991 | Shinohara et al. |
| 5,063,270 | A | 11/1991 | Yukimoto et al. |
| 5,175,325 | A | 12/1992 | Brown et al. |
| 5,210,129 | A | 5/1993 | de la Croi Habimana et al. |
| 5,286,787 | A | 2/1994 | Podola et al. |
| 5,300,612 | A | 4/1994 | Saruyama |
| 5,350,824 | A | 9/1994 | Kobayashi |
| 5,436,061 | A | 7/1995 | Hannenman et al. |
| 5,534,588 | A | 7/1996 | Knepper et al. |
| 5,569,750 | A | 10/1996 | Knepper et al. |
| 5,688,888 | A * | 11/1997 | Burkus et al. .................. 528/22 |
| 5,863,976 | A | 1/1999 | Schneider |
| 5,914,382 | A | 6/1999 | Friebe et al. |
| 5,973,060 | A | 10/1999 | Ozaki et al. |
| 5,981,680 | A | 11/1999 | Petroff et al. |
| 6,451,440 | B2 | 9/2002 | Atwood et al. |
| 6,545,104 | B1 | 4/2003 | Mueller et al. |
| 6,599,633 | B1 | 7/2003 | Wolf et al. |
| 6,664,323 | B2 | 12/2003 | Lucas |
| 6,833,407 | B1 | 12/2004 | Ahmed et al. |
| 7,056,869 | B2 | 6/2006 | Guyomar et al. |
| 7,205,050 | B2 | 4/2007 | Haas |
| 7,462,669 | B2 * | 12/2008 | Osawa .......................... 524/837 |
| 7,605,203 | B2 | 10/2009 | Feng et al. |
| 7,754,800 | B2 | 7/2010 | Maton et al. |
| 8,022,162 | B2 | 9/2011 | Maton et al. |
| 8,067,519 | B2 | 11/2011 | Maton et al. |
| 8,076,411 | B2 | 12/2011 | Maton et al. |
| 8,084,535 | B2 | 12/2011 | Maton et al. |
| 8,088,857 | B2 | 1/2012 | Maton et al. |
| 8,153,724 | B2 | 4/2012 | Maton et al. |
| 2002/0005344 | A1 | 1/2002 | Heidlas et al. |
| 2003/0105260 | A1 | 6/2003 | Cook et al. |
| 2003/0195370 | A1 | 10/2003 | Taylor et al. |
| 2004/0122199 | A1 | 6/2004 | Scheim et al. |
| 2005/0020754 | A1 | 1/2005 | Haas |
| 2005/0054765 | A1 | 3/2005 | Putzer |
| 2007/0260078 | A1 * | 11/2007 | Bhat et al. ..................... 554/174 |
| 2008/0312365 | A1 | 12/2008 | Maton et al. |
| 2008/0312366 | A1 | 12/2008 | Maton et al. |
| 2008/0312367 | A1 | 12/2008 | Maton et al. |
| 2009/0215944 | A1 | 8/2009 | Maton et al. |
| 2009/0234052 | A1 | 9/2009 | Maton et al. |
| 2011/0136979 | A1 * | 6/2011 | Cogen et al. .................. 525/106 |
| 2012/0016063 | A1 | 1/2012 | Maton et al. |
| 2012/0059115 | A1 | 3/2012 | Stammer et al. |

FOREIGN PATENT DOCUMENTS

| | | |
|---|---|---|
| DE | 2802170 | 1/1978 |
| DE | 2653499 | 5/1978 |
| DE | 3217516 A1 | 11/1983 |
| DE | 3342027 C1 | 5/1985 |
| DE | 3342026 A1 | 7/1985 |
| DE | 19654488 A1 | 7/1998 |
| EP | 0043501 A1 | 1/1982 |
| EP | 0093918 A1 | 11/1983 |
| EP | 0154922 | 5/1985 |
| EP | 0196565 A1 | 10/1986 |
| EP | 0215470 A1 | 3/1987 |
| EP | 0221824 A1 | 5/1987 |
| EP | 0277740 A2 | 8/1988 |
| EP | 0315333 A2 | 5/1989 |
| EP | 0378420 A2 | 7/1990 |
| EP | 0382365 A2 | 8/1990 |
| EP | 0397036 A2 | 11/1990 |
| EP | 0435328 A2 | 7/1991 |
| EP | 0522776 A1 | 1/1993 |
| EP | 0537785 A1 | 4/1993 |
| EP | 0651022 A2 | 5/1995 |
| EP | 0679674 A2 | 11/1995 |
| EP | 0801101 A1 | 10/1997 |
| EP | 0802233 A2 | 10/1997 |
| EP | 0807667 A2 | 11/1997 |
| EP | 0842974 A1 | 5/1998 |
| EP | 0860459 A2 | 8/1998 |
| EP | 0860461 A2 | 8/1998 |
| EP | 0885921 A2 | 12/1998 |
| EP | 0909778 A1 | 4/1999 |
| EP | 0982346 A1 | 3/2000 |
| EP | 1008598 A2 | 6/2000 |
| EP | 1041119 A2 | 10/2000 |
| EP | 1138715 A1 | 10/2001 |
| EP | 1179567 | 2/2002 |
| EP | 1252252 | 10/2002 |
| EP | 1368426 | 12/2003 |
| EP | 1254192 B1 | 8/2004 |
| EP | 1481038 | 12/2004 |
| EP | 1905795 A1 | 4/2008 |
| GB | 756613 | 9/1956 |
| GB | 756614 | 9/1956 |
| GB | 895091 | 5/1962 |
| GB | 918823 | 2/1963 |
| GB | 1289526 | 9/1972 |
| GB | 1490240 | 10/1977 |
| GB | 2012789 A | 8/1979 |
| GB | 2041955 A | 9/1980 |
| GB | 2107726 A | 5/1983 |
| GB | 2252975 A | 8/1992 |
| GB | 2424898 A | 10/2006 |
| JP | 59100136 | 6/1984 |
| JP | 59176326 | 10/1984 |
| JP | 62253629 | 11/1987 |
| JP | 63-083167 | 4/1988 |
| JP | 01-152131 | 6/1989 |
| JP | 01-152156 | 6/1989 |
| JP | 05-178996 | 7/1993 |
| JP | 06-016813 | 1/1994 |
| JP | 9506667 | 6/1997 |
| JP | 2000-026726 | 1/2000 |
| JP | 2000-103857 | 11/2000 |
| JP | 2000-191912 | 11/2000 |
| JP | 2003-252996 | 9/2003 |
| WO | WO 9532245 | 11/1995 |
| WO | WO 99/06473 A1 | 2/1999 |
| WO | WO 99/65979 A1 | 12/1999 |
| WO | WO 99/66012 A2 | 12/1999 |
| WO | WO 00/27910 A1 | 5/2000 |
| WO | WO 00/61672 A1 | 10/2000 |
| WO | WO 01/49774 A2 | 7/2001 |
| WO | WO 01/53425 A2 | 7/2001 |
| WO | WO 01/79330 A1 | 10/2001 |
| WO | WO 02/062893 A2 | 8/2002 |
| WO | WO 03/006530 A1 | 1/2003 |
| WO | WO 03/074634 A2 | 9/2003 |
| WO | WO 03/080713 A1 | 10/2003 |
| WO | WO 2005/019308 A1 | 3/2005 |
| WO | WO 2005/103117 A1 | 11/2005 |
| WO | WO 2006/106362 A1 | 10/2006 |
| WO | WO 2008/045427 A1 | 4/2008 |
| WO | WO 2010/108853 A1 | 9/2010 |

OTHER PUBLICATIONS

English language abstract for EP 0043501 extracted from delphion.com database dated Jul. 22, 2008.

English language abstract for EP 0093918 extracted from espacenet.com database dated Jul. 18, 2008.

English language abstract for EP 0215470 extracted from delphion.com database dated Jul. 22, 2008.

English language abstract for EP 0801101 extracted from espacenet.com database dated Jul. 15, 2008.

English language abstract for EP 0807667 extracted from espacenet.com database dated Jul. 15, 2008.

English language abstract for EP 0885921 extracted from espacenet.com database dated Jul. 18, 2008.

Article: Kirk-Othmer, "Silicone Compounds", Encycolpedia of Chemical Technology, 4th edition, vol. #22, 1997, pp. 107-109.

PCT International Search Report for PCT/GB2006/050075, dated Jul. 28, 2006, 4 pages.

PCT International Search Report for PCT/GB2006/050074, dated Aug. 2, 2006, 4 pages.

PCT International Search Report for PCT/GB2006/050072, dated Jul. 21, 2006, 4 pages.
PCT International Search Report for PCT/GB2006/050073, dated Aug. 2, 2006, 5 pages.
PCT International Search Report for PCT/EP2006/061285, dated Jul. 28, 2006, 4 pages.
PCT International Search Report for PCT/US2006/011986, dated Aug. 2, 2006, 3 pages.
English language translation for JP 2000-191912 extracted from IPDL database on Nov. 3, 2011, 156 pages.
Dictionary of Chemistry and Chemical Technology, 2 pages (title page and p. 1250); Author: Hua xue hua gong da ci dian" bian wei hui.; Hua xue gong ye chu ban she. Ci shu bian ji bu Publisher: Hua xue gong ye chu ban she, 2003 ISBN: 7502526110 9787502526115.
Aart Molenberg et al., A Fast Catalyst System for the Ring-Opening Polymerization of Cyclosiloxanes, Macromol, Rapid Commun. 16, 449-453 (1995), 5 pages.
Reinhard Schwesinger, Extremely Strong, Uncharged Auxiliary Bases; Monomeric and Polymer-Supported Polyaminophosphazenes (P2-P5), 1996, 27 pages.
A.W. Karlin et al., Uber Syntheseverfahren von Siloxanelastomeren, 5 pages.
Mark E. Van Dyke, et al., Reaction Kinetics for the Anionic Ring-Opening Polymerization of Tetraphenyletramethylcyclo-Tetrasiloxane Using a Fast Catalyst System, 2 pages.
English language abstract not available for JP 62253629; however, see English language equivalent US 4824891. Original document extracted from the espacenet.com database on Mar. 19, 2012, 15 pages.
English language translation for JP 2003-252996 extracted from PAJ database on Jun. 13, 2011, 13 pages.
English language translation for JP 2000-026726 extracted from PAJ database on Jun. 13, 2011, 27 pages.
English language abstract for JP 63-083167 extracted from PAJ database on Jun. 13, 2011, 6 pages.
English language translation for JP 2000-103857 extracted from PAJ database on Jun. 13, 2011, 22 pages.
English language abstract for JP 01-152156 extracted from PAJ database on Jun. 13, 2011, 14 pages.
English language translation for JP 05-178996 extracted from PAJ database on Jun. 13, 2011, 17 pages.
English language abstract for JP 9506667 extracted from espacenet.com database on Jun. 13, 2011, 31 pages.
English language abstract for JP 01-152131 extracted from PAJ database on Jun. 13, 2011, 7 pages.
English language translation for JP 06-016813 extracted from PAJ database on Jun. 13, 2011, 13 pages.
PCT International Search Report for PCT/EP2010/053569, dated May 21, 2010, 4 pages.
English language abstract for DE 19654488 extracted from the espacenet.com database on Mar. 14, 2012, 7 pages.
PCT International Search Report for PCT/EP2010/053567, dated Jun. 2, 2010, 3 pages.
English language abstract for EP 0221824 extracted from the espacenet.com database on Mar. 14, 2012, 17 pages.
English language abstract not available for JP 59176326; however, see English language equivalent US 4,433,096. Original document extracted from the espacenet.com database on Mar. 19, 2012, 13 pages.
Chenghong Li: "Preparation of Nitrile Containing Siloxane Triblock Copolymers and their Application as Stabilizers for Siloxane Magnetic Fluids (Thesis)" 1996, pp. 22-27.
Mingotaud et al., "Cationic and anionic ring-opening polymerization in supercritical CO2", Macromol. Symp. 153, 77-86 (2000).
Mingotaud et al., "Cationic and Anionic Ring-Opening Polymerization in Supercritical CO2, Preliminary Results", Polymer Journal, vol. 31, No. 5, pp. 406-410 (1999).

\* cited by examiner

PREPARATION OF ORGANOSILOXANE POLYMERS

RELATED APPLICATIONS

This application claims priority to and all the advantages of International Patent Application No. PCT/EP2010/053567, filed on Mar. 18, 2010, which claims priority to Great Britain Patent Application No. GB 0905204.4, filed on Mar. 26, 2009.

This invention is concerned with the condensation polymerisation of organosiloxane polymers, optionally in the presence of a diluent, at high pressures.

It is well known that linear and branched siloxane oligomers or short chain polymers having 2 or more hydroxyl and/or other hydrolysable groups per molecule may be polymerised via a polycondensation reaction pathway to high molecular weight, high degree of polymerisation (dp) polymers by polymerisation in the presence of a suitable condensation catalyst and, where deemed necessary, heat. Polycondensation (otherwise known as condensation polymerisation) is the polymerisation of monomers and/or oligomers with the elimination of low molecular weight by-product(s) such as water, and alcohols containing between 1 and 6 carbon atoms, typically methanol and ethanol). It is known to undertake such polymerisation processes under reduced pressure as the pressure reduction assists in the removal of the low molecular weight by-products.

A new process for the polycondensation of siloxane oligomers and/or short chain polymers is described in WO2006/106362 in which additionally an extender (sometimes referred to as a processing aid) and/or a plasticiser, typically used in compositions containing the polymer end-product, such as silicone based sealants, is present during polymerisation. Generally the extender and/or plasticiser is unreactive with the reactants, intermediates and the reaction product(s). This innovative method may result in the preparation of exceptionally long chain polymers whilst avoiding processing problems when subsequently used in compositions. The presence of the plasticiser and/or extender maintains the diluted polymer at a manageable viscosity, whilst the polymer itself would, in the absence of the plasticiser and/or extender, have a viscosity of many millions of mPa·s at 25° C. WO2006/106362 indicates that polycondensation reactions may be carried out at any suitable pressure although in order to facilitate removal of by-products formed during the condensation, for example, water, HCl or alcohol, the polymerisation process may take place at a pressure below 80 kPa. It further indicates that condensation type reactions involving equilibration, may be carried out at pressures above atmospheric if so desired but no examples of the latter process are provided.

Methods for the production of siloxane polymers using high pressure have been previously described but none of them involve a polycondensation polymerisation process. For example, GB756613, GB756614, U.S. Pat. No. 2,759,007 U.S. Pat. No. 2,759,008 and U.S. Pat. No. 4,250,290 all describe ring-opening polymerisation processes involving cyclic polysiloxane monomers which are treated with a suitable catalyst and heat, so that cyclic chains are broken and the resulting products polymerise. Typically during polymerisation using such methods no hydroxyl or other hydrolysable groups are present on the starting materials but suitable chain-stoppers may be added which contain hydroxyl groups. The mechanism for ring opening polymerisation is totally different from that of polycondensation and the effects of pressure on ring opening polymerisation techniques can't be extrapolated to be equivalent for polycondensation polymerisation.

EP0221824 describes a process for the acid or base catalysed polymerisation of cyclic polydiorganosiloxane oligomers or mixtures of cyclic and linear polydiorganosiloxane oligomers having at least one —OH group per molecule. The polymerisation process in EP0221824 takes place in at least one fluid under superatmospheric pressure. The physical state of the fluid during polymerisation is chosen from:
(i) A gas under supraatmospheric pressure
(ii) a liquid state; or
(iii) a supercritical state
and the resulting polymer is recovered by "expansion" i.e. removal of the fluid by allowing it to change into its normal gaseous state. This results in a substantially undiluted polymer which at high viscosities will be in viscosity of many millions of mPa·s at 25° C. However, the experimental data provided shows that a small but significant amount of low molecular weight volatile siloxanes (>2% by weight) remain in the polymer subsequent to preparation and hence a pure polymer is not obtained. It is further to be appreciated that from the relatively high levels of residual volatile siloxanes located it is apparent that when discharged from the reaction vessel after polymerisation the fluid does not extract the volatile siloxanes out of the polymer. Whilst examples 20 and 21 of EP0221824 disclose the use of dihydroxypolydimethylsiloxane, it is to be appreciated that this polymer is used as an end blocker which redistributes the OH groups thereon via an equilibration process and water is not removed from the reaction. Hence polycondensation is not taking place in these examples.

Surprisingly the inventors have found that significant reaction rate increases can be obtained during the polycondensation of linear and/or branched siloxane oligomers or short chain polymers having 2 or more hydroxyl and/or other hydrolysable groups per molecule by undertaking the process at high pressures despite all the ingredients being in liquid form and therefore, from typical expectations, unlikely to be significantly affected by such pressure increases.

In accordance with the present invention there is provided a method of making a polysiloxane containing polymer comprising the steps of:
i) Preparing a polysiloxane containing polymer by the polycondensation of siloxane containing monomers and/or oligomers which comprise at least 2 condensable groups per molecule, in the presence of
   a) one or more condensation catalysts and optionally one or both of
   b) a diluent and/or an end-blocking agent; and
ii) Where required quenching the polymerisation process;
iii) wherein, when present, the diluent is substantially retained within the resulting diluted polysiloxane containing polymer, characterised in that the process takes place at a pressure of at least $75 \times 10^5$ Pa.

The concept of "comprising" where used herein is used in its widest sense to mean and to encompass the notions of "include" and "consist of". Unless otherwise indicated all viscosity values given are at a temperature of 25° C. Preferably the method relates to a "pure" polycondensation system where the only reaction taking place or substantially the only reaction taking place is polycondensation.

A polysiloxane containing polymer is intended to mean a polymer comprising multiple polysiloxane groups per molecule and is intended to include a polymer substantially containing solely polysiloxane groups in the polymer chain or polymers where the backbone contains both polysiloxane groups and organic polymeric groups in the polymer chain.

Preferably the condensable end groups on the oligomers used in the process of the present invention are hydroxyl end groups or hydrolysable end groups (e.g. alkoxy groups). The inventors have found that the condensation polymerisation process in accordance with the present invention may utilise any known suitable oligomer(s) with one or more of the condensation catalysts.

Hence, one preferred method for the polymerisation process in accordance with the present invention is the polymerisation of non-cyclic (i.e. straight chain and/or branched) siloxane containing oligomers comprising multiple units of formula (1)

$$R'_a SiO_{4-a/2} \quad (1)$$

wherein each R' may be the same or different and denotes, hydrogen, a hydrocarbon group having from 1 to 18 carbon atoms, a substituted hydrocarbon group having from 1 to 18 carbon atoms or a hydrocarbonoxy group having up to 18 carbon atoms and "a" has, on average, a value of from 1 to 3, preferably 1.8 to 2.2. Preferably the siloxane containing oligomers have a viscosity of between 10 mPa·s and 50000 mPa·s at 25° C.

For the purpose of this application "Substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as aminofunctional groups, amido-functional groups, and cyano-functional groups; sulphur atoms; and sulphur atom containing groups such as mercapto groups.

Particularly preferred examples of groups R' include methyl, ethyl, propyl, butyl, vinyl, cyclohexyl, phenyl, tolyl group, a propyl group substituted with chlorine or fluorine such as 3,3,3-trifluoropropyl, chlorophenyl, beta-(perfluorobutyl)ethyl or chlorocyclohexyl group. Preferably, at least some and more preferably substantially all of the groups R' are methyl. Some R' groups may be hydrogen groups. Preferably the siloxane containing oligomers are linear or branched polydialkylsiloxanes, most preferably linear or branched polydimethylsiloxanes. Most preferably the siloxane containing oligomers are linear polydimethylsiloxanes.

The siloxane containing oligomers are preferably substantially linear materials, which are end-blocked with a siloxane unit of the formula $R''_3SiO_{1/2}$, wherein each R" is the same or different and is R' or a condensable group. Any suitable combination of condensable end groups may be used for the polymerisation process of the present invention (i.e. the condensable groups chosen must be able to undergo a condensation reaction together in order to polymerise). Preferably at least one R" group is a hydroxyl or hydrolysable group. Typically the condensable groups used as monomer/oligomer end-groups are as indicated above but may be any groups which will participate in a polycondensation of the monomer/oligomer at high pressure in accordance with the present invention. A small amount (<20%) of groups $R''_3SiO_{1/2}$, may comprise non-hydrolysable end-groups such as trialkylsilyl groups.

It will also be appreciated that, where required, a mixture of siloxane containing oligomers having appropriate condensable end groups so as to be polymerisable with each other may be used to form random copolymers or ABA or $AB_n$ type block copolymers. Such siloxane containing oligomers the polymeric chain may comprise blocks made from chains of units depicted in (1) above such that when there are 2 R' groups present (i.e. a=2 as with most units of the polymer), the R' groups are:

both alkyl groups (preferably both methyl or ethyl), or
alkyl and phenyl groups, or
alkyl and fluoropropyl, or
alkyl and vinyl or
alkyl and hydrogen groups.

Typically at least one block will comprise siloxane units in which both R' groups are alkyl groups.

It will also be appreciated that, where required, organic monomers and/or oligomers having appropriate condensable end groups so as to be polymerisable with said organopolysiloxane monomers and/or oligomers may be introduced in order to form random copolymers or ABA or $AB_n$ type block copolymers. Preferably the organic monomers and/or oligomers comprise two or more condensable groups which are condensable with the condensable groups of the siloxane monomers and/or oligomers. Examples of organic monomers which may be used in accordance with the present invention include, for example polystyrene and/or substituted polystyrenes such as poly(α-methylstyrene), poly(vinylmethylstyrene), poly(p-trimethylsilylstyrene) and poly(p-trimethylsilyl-α-methylstyrene). Other organic components may include acetylene terminated oligophenylenes, vinylbenzyl terminated aromatic polysulphones oligomers, aromatic polyesters and aromatic polyester based monomers.

However perhaps the most preferred organic based polymeric blocks in A are polyoxyalkylene based blocks. Such polyoxyalkylene compounds preferably comprise a linear predominantly oxyalkylene polymer comprised of recurring oxyalkylene units, ($-C_nH_{2n}-O-$) illustrated by the average formula ($-C_nH_{2n}-O-$)$_y$ wherein n is an integer from 2 to 4 inclusive and y is an integer of at least four. At least some of the hydrogen units may be substituted with alternative substituents. The average molecular weight of each polyoxyalkylene polymer block may range from about 300 to about 10,000 g/mol. Moreover, the oxyalkylene units are not necessarily identical throughout the polyoxyalkylene monomer, but can differ from unit to unit. A polyoxyalkylene block, for example, can be comprised of oxyethylene units, ($-C_2H_4-O-$); oxypropylene units ($-C_3H_6-O-$); or oxybutylene units, ($-C_4H_8-O-$); or mixtures thereof. In one embodiment of the present invention the oxyalkalene polymer may preferably comprise perhalooxyalkylene groups, most preferably perfluoroxyalkylene groups.

Other polyoxyalkylene monomers and/or oligomers may include for example: units of the structure—

$$-[-R^e-O-(-R^f-O-)_p-Pn\text{-}CR^g{}_2-Pn\text{-}O-$$
$$(-R^f-O-)_q-R^e]-$$

in which Pn is a 1,4-phenylene group, each $R^e$ is the same or different and is a divalent hydrocarbon group having 2 to 8 carbon atoms, each $R^f$ is the same or different and, is, an ethylene group or propylene group, each $R^g$ is the same or different and is a hydrogen atom or methyl group and each of the subscripts p and q is a positive integer in the range from 3 to 30.

The polycondensation process as hereinbefore described requires a suitable condensation catalyst for reactions to proceed. Any suitable polycondensation catalyst may be utilised. The amount of catalyst used will vary dependent on the catalyst utilised. However typically the catalyst used will be present in an amount up to a maximum of about 5% of the weight of the composition. For example the catalyst may comprise a Bronsted acid or a Lewis acid. The Catalyst may alternatively be a mixture of such acids. Any suitable Bronsted acid or Lewis acid may be utilised. Lewis acid catalysts, (a "Lewis acid" is any substance that will take up an electron pair to form a covalent bond) suitable for the polymerisation in the present invention include, for example, boron trifluoride $FeCl_3$, $AlCl_3$, $ZnCl_2$, $ZnBr_2$, $B(C_6F_5)_3$ and catalysts of formula $M^1R^{21}{}_qX^2{}_f$ where $M^1$ is B, Al, Ga, In or Tl each $R^{21}$ is independently the same (identical) or different and represents a monovalent aromatic hydrocarbon radical having from 6 to 14 carbon atoms, such monovalent aromatic hydrocarbon radicals preferably having at least one electron-withdrawing element or group such as —$CF_3$, —$NO_2$ or —CN, or substituted with at least two halogen atoms; $X^2$ is a halogen atom selected from the group consisting of F, Cl, Br, and I; q is 1, 2, or 3; and f is 0, 1 or 2; with the proviso that q+f=3. Lewis acid derivates of phosphonitrile halides and reaction products of phosphonitrile chloride and phosphate ester may also be used.

Suitable Bronsted acids (i.e. a substance which acts as a proton donor, or a precursor thereof), include sulphuric acid, phosphoric acid, alkylsulphuric acid (e.g. ethyl sulphuric acid), pyrophosphoric acid, nitric acid, boric acid, activated Fullers earth, organic acids such as citric acid, stearic acid, acetic acid, sulphonic acid, halosulphonic acids such as chlorosulphonic acid and alkanoic acids such as dodecanoic acid, or a precursor of any of the compounds mentioned, phosphorus halides ($POCl_3$ and $PCl_5$) and chlorophosphazenes.

Still more preferably, the Brönsted acid is an organic sulphonic acid comprising 10 C-atoms or more, more preferably 12 C-atoms or more, and most preferably 14 C-atoms or more, the sulphonic acid further comprising at least one aromatic group which may e.g. be a benzene, naphthalene, phenanthrene or anthracene group. In the organic sulphonic acid, one, two or more sulphonic acid groups may be present, and the sulphonic acid group(s) may either be attached to a non-aromatic, or preferably to an aromatic group, of the organic sulphonic acid.

Particularly preferred are those of the formula $R^{20}(SO_3H)_z$ in which $R^{20}$ represents an alkyl group preferably having from 6 to 18 carbon atoms such as for example a hexyl or dodecyl group, an aryl group such as a phenyl group or an alkaryl group such as dinonyl- or didoecyl-naphthyl. When $R^{20}$ is an alkyl group z=1 but when $R^{20}$ contains anaryl group then z may have a value of from 1 to 4. Preferably the compound used as organic aromatic sulphonic acid silanol condensation catalyst has from 10 to 200 C-atoms, more preferably from 14 to 100 C-atoms. Preferably $R^{20}$ is an alkaryl group having an alkyl group having from 4 to 30 and more preferably 6 to 18 carbon atoms.

When the catalyst is an organic aromatic sulphonic acid it may comprise the structural unit $R^{20}(SO_3H)_z$ one or several times, e.g. two or three times. For example, two $R^{20}(SO_3H)_z$ structural units may be linked to each other via a bridging group such as an alkylene group.

Most preferred are alkylphenyl sulphonic acids such as, for example, dodecylbenzenesulphonic acid (DBSA). Whilst this group of catalysts are excellent condensation catalysts the prior art teaches that they are not condensation specific. In particular, DBSA is also known to be a surface-active equilibration catalyst (see for example U.S. Pat. No. 4,654,041). Equilibration catalysts are able to catalyse both the scission and formation of siloxane bonds and as such cause the formation of short chain cyclic siloxanes as well as catalyzing the condensation polymerisation reaction taking place.

This dual catalytic activity of DBSA means that the end product of the reaction process in accordance with the present invention would be expected by the man skilled in the art to be determined by the relative speed of the polycondensation reaction versus the equilibration reaction. In many commercial condensation polymerisation processes the reaction by-product, e.g. water, is removed by utilization of a chemical or physical water scavenger (which needs to be chosen not to interfere with the polycondensation reaction) by adsorbing or quenching the catalyst. Alternatively the reaction by-product is removed by the application of a vacuum. This of course is not possible during the process of the present invention because of the necessity to keep the pressure in the reaction vessel (in which polymerization takes place) high. In some instances the catalyst can play the dual role of being both catalyst and water scavenger. For example DBSA can remove the water from the condensation equilibrium by forming micelles and phosphorus chloride based catalysts can remove the water chemically by reaction.

It is therefore very surprising to note that less than 0.2% by weight of the final siloxane product are octamethylcyclotetrasiloxane (henceforth referred to as "$D_4$") and less than 0.2% by weight of the final siloxane product is decamethylcyclopentasiloxane (henceforth referred to as "$D_5$") based on measurements using GC-FID (flame ionisation detection). This is particularly unexpected because in the present process no significant effort is made to remove the condensation reaction by-product (i.e. water) the man skilled in the art would expect the equilibration reaction to dominate increasingly as time goes by because of the ever increasing presence of the by-product, e.g. water, in the reaction product having a negative effect on the polycondensation reaction rate. Hence, the remarkably low levels of cyclic impurities, such as $D_4$ and $D_5$, prepared during the process in accordance with the present invention is completely contrary to the expectation of the man skilled in the art.

Further suitable condensation catalysts which may be used as the catalyst for the polymerisation reaction in the present invention include condensation catalysts incorporating tin, lead, antimony, iron, cadmium, barium, manganese, zinc, chromium, cobalt, nickel, aluminium, gallium or germanium and zirconium. Examples include metal triflates, organic tin metal catalysts such as triethyltin tartrate, tin octoate, tin oleate, tin naphthate, butyltintri-2-ethylhexoate, tinbutyrate, carbomethoxyphenyl tin trisuberate, isobutyltintriceroate, and diorganotin salts especially diorganotin dicarboxylate compounds such as dibutyltin dilaurate, dimethyltin dibutyrate, dibutyltin dimethoxide, dibutyltin diacetate, dimethyltin bisneodecanoate Dibutyltin dibenzoate, stannous octoate, dimethyltin dineodeconoate, dibutyltin dioctoate of which, when used dibutyltin dilaurate, dibutyltin diacetate are preferred.

Other catalysts include titanate or zirconate compounds such as tetrabutyltitanate, tetraisopropyltitanate, or chelated titanates or zirconates such as for example diisopropyl bis (acetylacetonyl)titanate, diisopropyl bis(ethylacetoacetonyl) titanate, diisopropoxytitanium Bis(Ethylacetoacetate) and the like. Such titanates may comprise a compound according to the general formula $Ti[OR]_4$ and $Zr[OR]_4$ respectively where each R may be the same or different and represents a monovalent, primary, secondary or tertiary aliphatic hydrocarbon group which may be linear or branched containing from 1 to 10 carbon atoms. Optionally the titanate may contain partially unsaturated groups. However, preferred examples of R include but are not restricted to methyl, ethyl, propyl, isopropyl, butyl, tertiary butyl and a branched secondary alkyl group such as 2,4-dimethyl-3-pentyl. Preferably, when each R is the same, R is an isopropyl, branched secondary alkyl group or a tertiary alkyl group, in particular, tertiary butyl.

For the avoidance of doubt an unbranched secondary alkyl group is intended to mean a linear organic chain which does not have a subordinate chain containing one or more carbon atoms, i.e. an isopropyl group, whilst a branched secondary alkyl group has a subordinate chain of one or more carbon atoms such as 2,4-dimethyl-3-pentyl.

Any suitable chelated titanates or zirconates may be utilised. Preferably the chelate group used is a monoketoester such as acetylacetonate and alkylacetoacetonate giving chelated titanates such as, for example diisopropyl bis(acetylacetonyl)titanate, diisopropyl bis(ethylacetoacetonyl)titanate, diisopropoxytitanium Bis(Ethylacetoacetate) and the like. Examples of suitable catalysts are additionally described in EP1254192 and WO200149774 which are incorporated herein by reference.

Other condensation catalysts include n-hexylamine, tetramethylguanidine, carboxylates of rubidium or caesium, hydroxides of magnesium, calcium or strontium and other catalysts as are mentioned in the art, e.g. in GB patent specifications 895091, 918823 and EP 0382365. Also preferred are catalysts based on phosphonitrile chloride, for example those prepared according to U.S. Pat. Nos. 3,839,388 and 4,564,693 or EP application 215 470 and phosphonitrile halide ion based catalysts, as described in GB2252975, having the general formula $[X^2(PX^2_2\!\!=\!\!N)_s PX^2_3]^+[M^2 X^2_{(v-t+1)} R^{III}_t]^-$, wherein $X^2$ denotes a halogen atom, $M^2$ is an element having an electronegativity of from 1.0 to 2.0 according to Pauling's scale, $R^{III}$ is an alkyl group having up to 12 carbon atoms, has a value of from 1 to 6, v is the valence or oxidation state of $M^2$ and t has a value of from 0 to v–1.

Alternatively the catalyst may comprise an oxygen-containing chlorophosphazene containing organosilicon radicals having the following general formula:

$$Z^1\text{—}PCl_2\!=\!N(\text{—}PCl_2\!=\!N)_n\text{—}PCl_2\text{—}O$$

in which
$Z^1$ represents an organosilicon radical bonded to phosphorus via oxygen, a chlorine atom or the hydroxyl group and
n represents 0 or an integer from 1 to 8.

The catalyst may also comprise condensation products of the above and/or tautomers thereof (the catalyst exists in a tautomeric form when $Z^1$ is a hydroxyl group). All or some of the chlorine atoms can be replaced by radicals Q, in which Q represents the hydroxyl group, monovalent organic radicals, such as alkoxy radicals or aryloxy radicals, halogen atoms other than chlorine, organosilicon radicals and phosphorus-containing radicals. The oxygen-containing chlorophosphazenes of formula (I) are preferably those in which no chlorine atom is replaced by a radical Q.

A further alternative catalyst which might be used as the catalyst in the present invention is any suitable compound providing a source of anions comprising at least one quadri-substituted boron atom and protons capable of interaction with at least one silanol group as defined in WO 01/79330. For this type of catalyst, it is important that the boron containing anion does not itself form a covalent bond directly to a silicon atom and that it does not decompose or rearrange to produce an anion which forms a covalent bond directly to a silicon atom. Suitable materials include those incorporating one or more boron atoms disposed within a grouping and several, for example ten or more, halogen atoms connected with each boron atom. The halogen atoms in such compound may be connected to boron atoms by linkages incorporating at least one carbon atom and are selected from fluorine, chlorine and bromine, the most preferred being fluorine.

Preferred anions incorporate one or more atoms of boron having four organic substituents thereon the most preferred being quadri-substituted borates. The organic substituents are suitably halogenated hydrocarbon groups. Such as pentafluorinated phenyl groups and bis(trifluoromethyl)phenyl groups and preferred materials have four such groups bonded to each boron atom. Examples include tetrakis (pentafluoro phenyl) borate anion (perfluorinated aryl borate ion) and the material is preferably employed as the acid of this anion namely $H^+\{(C_6F_5)_4B\}^-$. Other operative materials include anions having two quadri-substituted boron atoms, for example diperfluorinatedaryl borate ions, e.g. $.H^+\{B(C_6F_5)_3CNB(C_6F_5)_3\}^-$. Other suitable boron-containing anions for use in the process of the present invention include carboranes, for example of the formula $\{CB_9H_{10}\}^-$, $\{CB_9X^2_5H_5\}^-$, $\{CB_{11}H_{12}\}^-$ and $\{CB_{11}X^2_6H_6\}^-$ wherein each $X^2$ is the same or different and represents a halogen. Carboranes may contain boron atoms which are more highly substituted than quadri-substituted, e.g. pentasubstituted and hexa-substituted, and for the sake of clarity "quadri-substituted" where used herein is intended to include those anions containing quadri-substituted and higher substituted boron atoms.

A further group of catalysts which may be utilised are materials providing in the polymerisation reaction mixture a source of (a) protons capable of interaction with at least one of said silicon bonded hydroxy or alkoxy groups and (b) weakly co-ordinating anions (i.e. an anion which has a negative charge distributed through a comparatively large radical in such a way that the anion is comparatively weakly attractive to proton in the organosilicon reaction mixture i.e. e. is not a strong nucleophile). These include materials having one or more suitable atoms $M^2$, of an element selected from the group consisting of boron, niobium, and aluminium, disposed within the grouping and several, for example ten or more, halogen atoms connected with each atom $M^2$. The halogen atoms in such compound may be connected to atoms $M^2$ by linkages incorporating at least one carbon atom. The halogen atoms are preferably selected from fluorine, chlorine and bromine, the most preferred being fluorine. The preferred weakly coordinating anions may incorporate one or more atoms M of any suitable element capable of supporting an anion substituted to the extent of one more substituent on the atom $M^2$ than its neutral valence, for example four substituents on aluminium or boron or six substituents on niobium. Preferred anions incorporate one or more atoms of boron having four organic substituents thereon the most preferred being quadri-substituted borates. The organic substituents are suitably hydrocarbon groups. Three and preferably four of these hydrocarbon groups are preferably aromatic groups, and are preferably highly halogenated. Preferred halogenated hydrocarbons are pentafluorinated phenyl groups and bis(trifluoromethyl)phenyl groups and preferred materials have four such groups bonded to each boron atom. One operative weakly co-ordinating anion is the tetrakis (pentafluoro phenyl)borate anion (otherwise herein referred to as the perfluorinated aryl borate ion) and the material providing the source of protons (a) and weakly co-ordinating anions (b) is the acid of this anion namely $H^+\{(C_6F_5)_4B\}^-$.

Preferably the condensation catalyst will be present in an amount of from 0.01 to 6 and more preferably from 0.1 to 3 parts by weight per 100 parts by weight of the oligomers. The catalyst may be present in an amount of greater than 6 parts by weight in cases where chelating agents are used.

The activity of the catalyst is preferably quenched by using a neutralizing agent which reacts with the catalyst to render it non-active. Typically in the case of the acid type condensation catalysts the neutralising agent is a suitable base, for example, an amine such as a mono/di and trialkanolamine, specific examples include but are not limited to monoethanolamine (MEA) and triethanolamine (TEA). In the case of systems using a DBSA catalyst alternative quenching means include aluminasilicate zeolite materials that were found to absorb DBSA and leave a stable polymer. In most cases catalyst residues remain in the polymer product or where appropriate may be removed by filtration or alternative methods. In the case of phosphazene based catalysts once the desired polymer viscosity has been reached, the viscosity of the organosilicon compound obtained in the process can be kept substantially constant by a procedure in which the catalyst used, or a reaction product which has been formed incorporating catalyst residues which likewise promotes the polymerisation process, is inhibited or deactivated by addition of inhibitors or deactivators. Any suitable inhibitors and/or inactivators may be used; specific examples include but are not restricted to triisononylamine, n-butyllithium, lithium siloxanolate, hexamethyldisilazane and magnesium oxide.

The optional diluent which may be utilised in the process in accordance with the present invention is one or more extenders and/or one or more plasticisers. The extenders and/or plasticisers are selected so as to be unreactive with the reactants, intermediates and the reaction product(s) of the process in accordance with the present invention.

Any suitable plasticiser or extender or combination thereof may be utilised in the process in accordance with the present invention.

A plasticiser (otherwise referred to as a primary plasticiser) is added to a polymer composition to improve properties such as increasing the flexibility and toughness of the resulting cured product. This is generally achieved by reduction of the glass transition temperature ($T_g$) of the cured polymer composition thereby, in the case of sealants, enhancing the elasticity of the sealant. Plasticisers are also used to reduce the modulus of e.g. sealant formulations. Whilst plasticisers may reduce the overall unit cost of a sealant that is not their main intended use. Some plasticisers can be expensive and could increase the unit cost of a sealant formulation in which they are used but are utilised because of the properties they provide to the finished product. Plasticisers tend to be generally less volatile than extenders and are typically introduced into the polymer composition in the form of liquids or low melting point solids (which become miscible liquids during processing. Typically, for silicone based compositions plasticisers are organopolysiloxanes which are unreactive with the siloxane polymer of the composition, such as polydimethylsiloxane having terminal triorganosiloxy groups wherein the organic substituents are, for example, methyl, vinyl or phenyl or combinations of these groups. Such polydimethylsiloxanes normally have a viscosity of from about 5 to about 100,000 mPa·s at 25° C.

Compatible organic plasticisers may additionally be used, examples include suitable dialkyl phthalates wherein the alkyl group may be linear and/or branched and contains from six to 20 carbon atoms; adipate, azelate, oleate and sebacate esters, polyols such as ethylene glycol and its derivatives, organic phosphates such as tricresyl phosphate and/or triphenyl phosphates, castor oil, tung oil, fatty acids and/or esters of fatty acids. Details of a wide variety of both plasticisers and extenders which have been used in sealant formulations are discussed in GB 2424898 which is incorporated herein by reference.

Historically, unreactive siloxanes such as trialkylsilyl terminated polydiorganosiloxanes (for example trimethylsilyl terminated polydimethyl siloxane (PDMS)) were originally used as extenders and/or plasticisers in silicone based sealants because they were chemically similar and had excellent compatibility.

An extender (sometimes also referred to as a process aid or secondary plasticiser) is used to dilute the sealant composition and basically make the sealant more economically competitive without substantially negatively affecting the properties of the sealant formulation. The introduction of one or more extenders into a silicone sealant composition not only reduces the overall cost of the product but can also affect the properties of resulting uncured and/or cured silicone sealants. The addition of extenders can, to a degree, positively effect the rheology, adhesion and clarity properties of a silicone sealant and can cause an increase in elongation at break and a reduction in hardness of the cured product both of which can significantly enhance the lifetime of the cured sealant provided the extender is not lost from the cured sealant by, for example, evaporation or exudation.

Particularly preferred extenders are mineral oil based (typically petroleum based) paraffinic hydrocarbons. Any suitable mixture of mineral oil fractions may be utilised as the extender in the present invention but high molecular weight extenders (e.g. >220) are particularly preferred. Examples include linear or branched mono unsaturated hydrocarbons such as linear or branched alkenes or mixtures thereof containing at least 12, e.g. from 12 to 25 carbon atoms; and/or mineral oil fractions comprising linear (e.g. n-paraffinic) mineral oils, branched (iso-paraffinic) mineral oils, cyclic (referred in some prior art as naphthenic) mineral oils and mixtures thereof. Preferably the hydrocarbons utilised comprise at least 10, preferably at least 12 and most preferably greater than 20 carbon atoms per molecule. Other examples include:

alkylcyclohexanes (molecular weight >220);
paraffinic hydrocarbons and mixtures thereof containing from 1 to 99%, preferably from 15 to 80% n-paraffinic and/or isoparaffinic hydrocarbons (linear branched paraffinic) and 1 to 99%, preferably 85 to 20% cyclic hydrocarbons (naphthenic) and a maximum of 3%, preferably a maximum of 1% aromatic carbon atoms. The cyclic paraffinic hydrocarbons (naphthenics) may contain cyclic and/or polycyclic hydrocarbons. Any suitable mixture of mineral oil fractions may be used, e.g. mixtures containing
i) 60 to 80% paraffinic and 20 to 40% naphthenic and a maximum of 1% aromatic carbon atoms;
ii) 30-50%, preferably 35 to 45% naphthenic and 70 to 50% paraffinic and or isoparaffinic oils;
iii) hydrocarbon fluids containing more than 60 wt. % naphthenics, at least 20 wt. % polycyclic naphthenics and an ASTM D-86 boiling point of greater than 235° C.;
iv) hydrocarbon fluid having greater than 40 parts by weight naphthenic hydrocarbons and less than 60 parts by weight paraffinic and/or isoparaffinic hydrocarbons based on 100 parts by weight of hydrocarbons.

Preferably the mineral oil based extender or mixture thereof comprises at least one of the following parameters:
i) a molecular weight of greater than 150, most preferably greater than 200;
ii) an initial boiling point equal to or greater than 230° C. (according to ASTM D 86).
iii) a viscosity density constant value of less than or equal to 0.9; (according to ASTM 2501)
iv) an average of at least 12 carbon atoms per molecule, most preferably 12 to 30 carbon atoms per molecule;
v) an aniline point equal to or greater than 70° C., most preferably the aniline point is from 80 to 110° C. (according to ASTM D 611);

vi) a naphthenic content of from 20 to 70% by weight of the extender and a mineral oil based extender has a paraffinic content of from 30 to 80% by weight of the extender according to ASTM D 3238);
vii) a pour point of from −50 to 60° C. (according to ASTM D 97);
viii) a kinematic viscosity of from 1 to 20 cSt at 40° C. (according to ASTM D 445)
ix) a specific gravity of from 0.7 to 1.1 (according to ASTM D1298);
x) a refractive index of from 1.1 to 1.8 at 20° C. (according to ASTM D 1218)
xi) a density at 15° C. of greater than 700 kg/m³ (according to ASTM D4052) and/or
xii) a flash point of greater than 100° C., more preferably greater than 110° C. (according to ASTM D 93)
xiii) a saybolt colour of at least +30 (according to ASTM D 156)
xiv) a water content of less than or equal to 250 ppm (according to ASTM D6304)
xv) a Sulphur content of less than 2.5 ppm (according to ASTM D 4927)

In the present invention the diluent may, when required, be only partially miscible or immiscible with polysiloxanes meaning that the polymerisation mixture may be in some circumstances a two phase system (dispersion). The inert fluid may comprise a suitable non-mineral based natural oil or a mixture thereof, i.e. those derived from animals, seeds and nuts and not from mineral oils (i.e. not from petroleum or petroleum based oils) such as for example almond oil, avocado oil, beef tallow, borrage oil, butterfat, canola oil, cardanol, cashew nut oil, cashew nutshell liquid, castor oil, citrus seed oil, cocoa butter, coconut oil, cod liver oil, corn oil, cottonseed oil, cuphea oil, evening primrose oil, hemp oil, jojoba oil, lard, linseed oil, macadamia oil, menhaden oil, oat oil, olive oil, palm kernel oil, palm oil peanut oil, poppy seed oil, rapeseed oil, rice bran oil, safflower oil, safflower oil (high oleic), sesame oil, soybean oil, sunflower oil, sunflower oil (high oleic), tall oil, tea tree oil, turkey red oil, walnut oil perilla oil, dehydrated castor oils, apricot oil, pine nut oil, kukui nut oil, amazon nut oil almond oil, babasu oil, argan oil, black cumin oil, bearberry oil, calophyllum oil, camelina oil, carrot oil, carthamus oil, cucurbita oil, daisy oil, grape seed oil, foraha oil, jojoba oil, queensland oil, onoethera oil, ricinus oil, tamanu oil, tucuma oil, fish oils such as pilchard, sardine and herring oils. The extender may alternatively comprise mixtures of the above and/or derivatives of one or more of the above.

A wide variety of natural oil derivates are available. These include transesterified natural vegetable oils, boiled natural oils such as boiled linseed oil, blown natural oils and stand natural oils. An example of a suitable transesterified natural vegetable oil is known as biodiesel oil, the transesterification product produced by reacting mechanically extracted natural vegetable oils from seeds, such as rape, with methanol in the presence of a sodium hydroxide or potassium hydroxide catalyst to produce a range of esters dependent on the feed utilised. Examples might include for example methyloleate ($CH_3(CH_2)_7CH=CH(CH_2)_7CO_2CH_3$).

Stand natural oils which are also known as thermally polymerised or heat polymerised oils and are produced at elevated temperatures in the absence of air. The oil polymerises by cross-linking across the double bonds which are naturally present in the oil. The bonds are of the carbon-carbon type. Stand oils are pale coloured and low in acidity. They can be produced with a wider range of viscosities than blown oils and are more stable in viscosity. In general, stand oils are produced from linseed oil and soya bean oil but can also be manufactured based on other oils. Stand oils are widely used in the surface coatings industry.

Blown oils which are also known as oxidised, thickened and oxidatively polymerised oils and are produced at elevated temperatures by blowing air through the oil. Again the oil polymerises by cross-linking across the double bonds but in this case there are oxygen molecules incorporated into the cross-linking bond. Peroxide, hydroperoxide and hydroxyl groups are also present. Blown oils may be produced from a wider range of oils than stand oils. In general, blown oils are darker in colour and have a higher acidity when compared to stand oils. Because of the wide range of raw materials used, blown oils find uses in many diverse industries, for example blown linseed oils are used in the surface coatings industry and blown rapeseed oils are often used in lubricants.

When the inert fluid is present during polymerisation of the polymer prepared in accordance with the present invention, it will be appreciated that the resulting polymer/extender/plasticiser mix has a significantly lower viscosity than would normally be expected during polymerisation and in the final product. This is because the viscosity reducing diluent(s) is/are present in the polymer mixture as it polymerises and does not participate in the polymerisation reaction process. This inclusion during polymerisation furthermore avoids the need for expensive and time consuming blending processes typically used in the industry for introducing extenders and plasticisers into a polymer composition, usually at the same time as some or all other constituents. Products of the process in accordance with the present invention may contain polymers of significantly greater chain length/molecular weight than could be practically used in combination with such blending processes. This is because the viscosity of such polymers would be too high to enable the sufficiently thorough blending of the diluent(s) into the polymer.

The ratio between the diluent(s) and the organopolysiloxane constituent in the product produced by the process of the present invention that can be achieved is dependent on the miscibility of the diluent(s) in the polydimethylsiloxanes and vice versa. The miscibility was found to depend at least in part, on the molecular weight of the organopolysiloxanes.

The optional end-blocking agent may be used to regulate the molecular weight of the polymer and/or add functionality. End-blocking agents are a means of controlling the reactivity/polymer chain length of the polymer by introducing compounds which will react with only one hydrolysable end group, subsequently preventing further polycondensation. It is also a means of introducing alternative end groups on the polymer, e.g. silicon bonded hydrogen groups, alkenyl groups which may then be utilised to produce alternative reactive end groups or provide a non-reactive end group. In the case where the end-blocking process aims to replace a silanol end-group with a triorganosiloxy group to prevent further polymerisation, this may be achieved by incorporating a triorganoalkoxy silane or a triorganosilanol in to the monomers and/or oligomers. Examples of such silanes are trimethyl methoxysilane, methyl phenyl dimethoxysilane, methyl phenyl vinyl ethoxysilane and aminopropyl trimethoxy silane. In the case where alkenyl end groups are required suitable end-blockers include, for example alkenyl silazanes. Hydrolysable groups which may be introduced using end-blocking agents include alkoxy groups and acetoxy groups and $-Si(OH)_3$, $-(R^a)Si(OH)_2$, $-(R^a)_2SiOH$, $-R^aSi(OR^b)_2$, $-Si(OR^b)_3$, $-R^a_2SiOR^b$ or $-R^a_2Si-R^c-SiR^d_p(OR)_{3-p}$ where each $R^a$ independently represents a monovalent hydrocarbyl group, for example, an alkyl group, in particular having from 1 to 8 carbon atoms, (and is preferably methyl); each $R^b$ and $R^d$ group is independently an alkyl or alkoxy group in which the alkyl groups suitably have up to 6 carbon atoms; $R^c$ is a divalent hydrocarbon group which may be interrupted by one or more siloxane spacers having up to six silicon atoms; and p has the value 0, 1 or 2. Water and other polycondensation by-products may also act as end-blockers.

The inventors found that undertaking the above discussed process at high pressures, i.e. in a range of from about $75\times10^5$ Pa to 100 MPa, preferably a range $75\times10^5$ Pa to 50 MPa (typically $>75\times10^5$ Pa, preferably $>100\times10^5$ Pa, most preferably $>150\times10^5$ Pa) resulted in a significant but unexpected improvement in the reaction rate. In the view of the inventors this is completely unexpected because the reaction takes places solely in the liquid phase and as such the effect of pressure on such a process would have been expected to be negligible because both the reactants and the products are liquids and the change in volume is not so significant as to lead to an expectation of a significant decrease in volume of the products compared to the reactants.

Preferably the product resulting from the polymerisation process in accordance with the present invention described comprises a polysiloxane based polymer containing at least two hydroxyl or hydrolysable groups, most preferably the polymer comprises terminal hydroxyl or hydrolysable groups. Preferably the polymer has the general formula $$X\text{-}A\text{-}X^1 \qquad (2)$$

where X and $X^1$ are independently selected from siloxane groups which terminate in hydroxyl or hydrolysable groups and A is a polymeric chain.

Examples of hydroxyl-terminating or hydrolysable groups X or $X^1$ include —Si(OH)$_3$, —(R$^a$)Si(OH)$_2$, —(R$^a$)$_2$SiOH, —R$^a$Si(OR$^b$)$_2$, —Si(OR$^b$)$_3$, —R$^a$$_2$SiOR$^b$ or —R$^a$$_2$Si—R$^c$—SiR$^d$$_p$(OR$^b$)$_{3-p}$ where each $R^a$ independently represents a monovalent hydrocarbyl group, for example, an alkyl group, in particular having from 1 to 8 carbon atoms, (and is preferably methyl); each $R^b$ and $R^d$ group is independently an alkyl or alkoxy group in which the alkyl groups suitably have up to 6 carbon atoms; $R^c$ is a divalent hydrocarbon group which may be interrupted by one or more siloxane spacers having up to six silicon atoms; and p has the value 0, 1 or 2. Preferably X and/or $X^1$ contain hydroxyl groups or groups which are otherwise hydrolysable in the presence of moisture.

Examples of suitable siloxane groups which may be present in A in formula (2) are those which comprise a poly-diorgano-siloxane chain. Thus group A preferably includes siloxane units of formula (3)

$$—(R^5{}_sSiO_{(4-s)/2})— \qquad (3)$$

in which each $R^5$ is independently an organic group such as a hydrocarbyl group having from 1 to 10 carbon atoms optionally substituted with one or more halogen group such as chlorine or fluorine and s is 0, 1 or 2, but is typically 2 for all non-terminal groups. Particular examples of groups $R^5$ include methyl, ethyl, propyl, butyl, vinyl, cyclohexyl, phenyl, tolyl group, a propyl group substituted with chlorine or fluorine such as 3,3,3-trifluoropropyl, chlorophenyl, beta-(perfluorobutyl)ethyl or chlorocyclohexyl group. Suitably, at least some and preferably substantially all of the groups $R^5$ are methyl.

Group A in the compound of formula (2) may include any suitable siloxane or siloxane/organic molecular chain providing the resulting polymer a viscosity (in the absence of diluent in accordance with the present invention of up to 20 000 000 mPa·s, at 25° C. (i.e. up to or even more than 200 000 units of formula (3)). In one preferred embodiment A is a linear organopolysiloxane molecular chain, i.e. s has an average value of from 1.8 to 2.2 for substantially all chain units. Preferred materials have polydiorganosiloxane chains according to the general formula (4)

$$—(R^5{}_2SiO)_t— \qquad (4)$$

in which each $R^5$ is as defined above and is preferably a methyl group and t has a value of up to 200 000. Suitable polymers have viscosities of up to or more than 20 000 000 mPa·s at 25° C. in the absence of the diluent in the process in accordance with the present invention but when prepared in the presence of diluent viscosities are generally in the order of 1000 to 100 000 mPa·s at 25° C. because of the presence of diluent.

Preferred polysiloxanes containing units of formula (4) are thus polydiorganosiloxanes having terminal, silicon-bound hydroxyl groups or terminal, silicon-bound organic radicals which can be hydrolysed using moisture as defined above. The polydiorganosiloxanes may be homopolymers or copolymers. Mixtures of different polydiorganosiloxanes having terminal condensable groups are also suitable.

In accordance with the present invention component A may alternatively comprise random or block copolymer a block copolymeric backbone comprising siloxane groups of the type depicted in formula (2) above and an organic component as hereinbefore described with respect to the starting materials discussed above. The most preferred organic based polymeric blocks in A are polyoxyalkylene based blocks of the types previously described. Backbone A may alternatively comprises solely the polyoxyalkylene blocks as hereinbefore described terminated by groups X and $X^1$ discussed above.

Preferably the diluted polymer of the present invention comprises a polymer component which in accordance with the present invention is a silicon containing polymer having a number average molecular weight ($M_w$) of at least 100000 g/mol as determined following ASTM D5296-05 and calculated as polystyrene molecular weight equivalents.

The polycondensation reaction in accordance with the present invention may be carried out at any appropriate temperature i.e. where appropriate catalysts are used (e.g. DBSA) the general method may be carried out in either batch or continuous modes of operation and no heat is required to facilitate the polymerisation (however heat may be applied to influence the chemical equilibrium, if required).

Any suitable method for making the polymer in accordance with the method of the present invention may be used. One suitable method, when using a diluent, would be to mix x parts of dimethylhydroxysilyl terminated polydimethyl siloxane oligomer with 100–x parts of a diluent in accordance with the present invention at room temperature and pressure and a suitable amount of catalyst, typically DBSA in an amount of from between 0.1 and 5.0% by weight of the combined weight of polymer and diluent. The diluent and catalyst may be added in any order to the monomer. Mixing is continued until the viscosity of the resulting product becomes constant or starts to decrease with time at which point the catalyst is quenched/neutralised by adding a suitable amount, typically 0.25-2% by weight of the combined weight of polymer and diluent, of an amine such as monoethanolamine. Alternatively the diluent may, for example be added imme-

diately after the polycondensation reaction has commenced or sequentially during the polymerisation process.

The polymerisation process in accordance with the invention may be carried out either batchwise or continuously using any suitable mixers. Where the polycondensation by-product is water, the water can either be removed by chemical drying using e.g. hydrolysable silanes like methyltrimethoxysilane or zeolites or by using freezing, evaporation, coalescing or centrifuging techniques.

In one embodiment of the invention the diluted polymer product may be emulsified in the presence of the diluent which has the advantage of providing a silicone emulsion containing very low amounts of cyclics volatile siloxane impurities.

This product of the process in accordance with the present invention also provides the user with formulations comprising the diluted polymer of the present invention with a variety of improved physical characteristics, not least the elasticity of resulting products, because of the use of polymers having polymer chain length/viscosities which hitherto would not have been possible to use. Applications include, sealants formulations, coating formulations, high consistency organopolysiloxane gum formulations for high consistency rubber applications, and for dispersions thereof in volatile and non-volatile alkylsilicone fluids for use in personal care products.

EXAMPLES

The present invention will now be exemplified. All viscosity measurements were made at 25° C. using a Brookfield LV DV-E viscosimeter unless otherwise indicated.

A polydimethylsiloxane polymer was prepared by polymerizing a mixture of 50 parts by weight of dimethyl hydroxyl terminated polydimethylsiloxane having a viscosity of 70 mPa·s at 25° C. and 50 parts by weight of an organic extender (Hydroseal® G 250H (sold by Total) using 2.4 parts by weight of DBSA (dodecylbenzensulfonic acid) as a catalyst. Polymerisation was carried at a variety of different pressures as depicted in Table 1 below using an hermetic rheometer cell consisting of concentric cylinders to which external pressure can be applied by means of a screw press. The rotating inner cylinder contains 4 magnets as well as the measuring head which is connected to a commercial rheometric drive (M5, Thermo-Haake, Karlsruhe Germany). The measuring cell was in a closed chamber. The rheometer was calibrated with a silicone of known viscosity. The viscosities of the mixture were measured versus time at a constant shear rate of 5 s$^{-1}$. Once a viscosity of approximately 50000 mPa·s at 23° C. was reached, the pressure was released and the polymerisation was stopped, by the addition of 1.5 parts by weight of TEA (triethanolamine). The resulting polymers extender blends were analysed by means of gel permeation chromatography (GPC) and Gas Chromatography (GC) for their molecular weight and cyclic siloxane content. Molecular weights and polydispersities (Mw/Mn) were determined by GPC following ASTM D5296-05 using toluene as solvent. The molecular weights were calculated as polystyrene molecular weight equivalents. Cyclic siloxane contents were measured using GC-FID (flame ionisation detection). An Agilent 6890 GC with autosampler and FID detection was used. The separation was made with a J&W DB-1 30 m*0.32 mm/0.25 µm column. Analysis was completed with a 1 µl injection into a split-splitless injector (split 10/1). Detector operation was at a temp of 260° C. Oven parameters were 50° C. for 2 min then ramped at 15 degrees per minute to 250° C., and then left at 250° C. for 10 min.

The results are depicted in Table 1.

TABLE 1

| Pressure (×10$^5$ Pa) | Polymerization time (min) | Mn kg/mol | Mw kg/mol | Mw/Mn | % D$_4$ | % D$_5$ |
|---|---|---|---|---|---|---|
| 1 | 14 | 190 | 390 | 2.06 | 0.097 | 0.082 |
| 80 | 10 | 202 | 419 | 2.07 | 0.085 | 0.075 |
| 150 | 7.5 | 198 | 400 | 2.02 | 0.082 | 0.073 |
| 300 | 5.5 | 201 | 417 | 2.08 | 0.083 | 0.077 |

The results show that under all conditions high molecular weight polymer was obtained. Levels of D$_4$ and D$_5$ determined by GC are lower if external pressure is applied to the system. The reaction time to produce a polymer with approx 300 kg/mol reduced by more than 50% by applying a pressure of 300×10$^5$ Pa versus atmospheric pressure. It was found that the viscosity of the reaction mixture increased substantially linearly with time and at higher pressures the gradient of the viscosity/time relationship noticeably increased.

The invention claimed is:

1. A method of making a polysiloxane containing polymer comprising the steps of:
   i) preparing a polysiloxane containing polymer by the polycondensation of siloxane containing monomers and/or oligomers which comprise at least 2 condensable groups per molecule, in the presence of
      (a) one or more condensation catalysts;
      (b) a diluent; and optionally
      (c) an end blocking agent;
   ii) where required quenching the polymerisation process; wherein the diluent is substantially retained within the resulting diluted polysiloxane containing polymer; wherein the process takes place at a pressure of at least 75×10$^5$ Pa.

2. A method in accordance with claim 1 wherein the polymerisation product has the general formula $$X\text{-}A\text{-}X^1$$

where A is a siloxane containing polymeric chain and X and X$^1$ are independently selected from siloxane groups which terminate in hydroxyl or hydrolysable groups selected from —Si(OH)$_3$, —(R$^a$)Si(OH)$_2$, —(R$^a$)$_2$SiOH, —R$^a$Si(OR$^b$)$_2$, —Si(OR$^b$)$_3$, —R$^a{}_2$SiOR$^b$ or —R$^a{}_2$Si—R$^c$—SiR$^d{}_p$(OR$^b$)$_{3-p}$, where each R$^a$ independently represents a monovalent hydrocarbyl group having from 1 to 8 carbon atoms; each R$^b$ and R$^d$ group is independently an alkyl or alkoxy group in which the alkyl groups have up to 6 carbon atoms; R$^c$ is a divalent hydrocarbon group optionally interrupted by one or more siloxane spacers having up to six silicon atoms; and p has the value 0, 1 or 2.

3. A method in accordance with claim 1 wherein the polymerisation process is a polycondensation polymerisation process in which a linear and/or branched organopolysiloxane having hydrolysable terminal groups is polymerised in the presence of a condensation catalyst selected from
   i) a catalyst of the general formula R20SO 3H in which R20 represents an alkyl group, an aryl or an alkaryl group;
   ii) a phosphonitrile halide catalyst;
   iii) phosphonitrile halide ion based catalysts;
   iv) a titanate and/or zirconate;
   v) protic acids;
   vi) Lewis acids;
   vii) organic and inorganic bases;
   viii) borates; and
   ix) boranes.

4. A method in accordance with claim 3 wherein the catalyst is dodecylbenzenesulphonic acid which is quenched by a mono/di and trialkanolamine or an aluminasilicate zeolite.

5. A method in accordance with claim 1 wherein the diluent is an extender or plasticiser.

6. A method in accordance with claim 1 wherein the diluent is selected from one or more of the group comprising
trialkylsilyl terminated polydimethyl siloxane,
polyisobutylenes (PIB),
phosphate esters polyalkylbenzenes, or
linear and/or branched alkylbenzenes esters of aliphatic monocarboxylic acids.

7. A method in accordance with claim 1 wherein the diluent is selected from one or more of the group comprising
linear or branched mono unsaturated hydrocarbons; and/or
mineral oil fractions comprising linear (n-paraffinic) mineral oils, branched (iso-paraffinic) mineral oils and/or cyclic (naphthenic) mineral oils and mixtures thereof.

8. A method in accordance with claim 1 wherein the diluent is at least substantially miscible with monomer/oligomer and the polymer.

9. A method in accordance with claim 1 wherein the process takes place at a pressure of $150 \times 10^5$ Pa or more.

10. A method in accordance with claim 1 wherein subsequent to polymerization, the polysiloxane containing polymer is emulsified.

11. A method in accordance with claim 1 wherein less than 0.2% by weight of the final siloxane product is octamethylcyclotetrasiloxane and less than 0.2% by weight of the final siloxane product is decamethylcyclopentasiloxane.

12. A method in accordance with claim 11 wherein less than 0.1% by weight of the final siloxane product is octamethylcyclotetrasiloxane and less than 0.1% by weight of the final siloxane product is decamethylcyclopentasiloxane.

* * * * *